March 1, 1927.
L. E. RICE
1,619,038
AUTOMOBILE LENS
Filed July 13, 1926
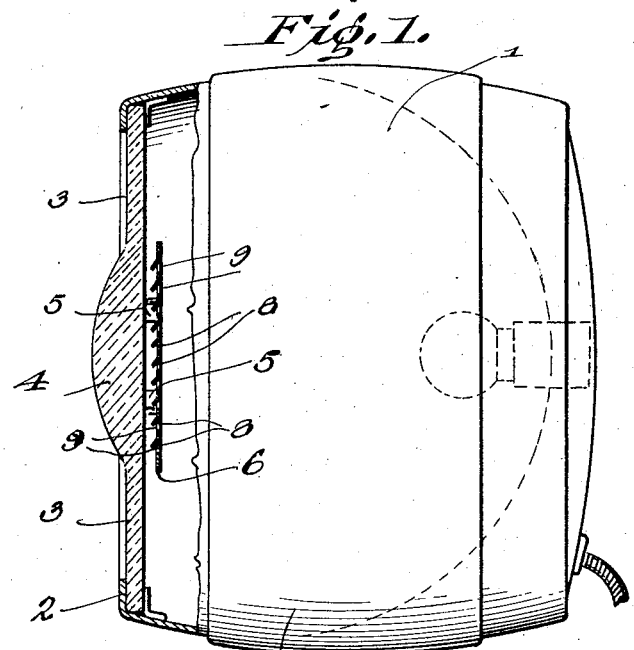
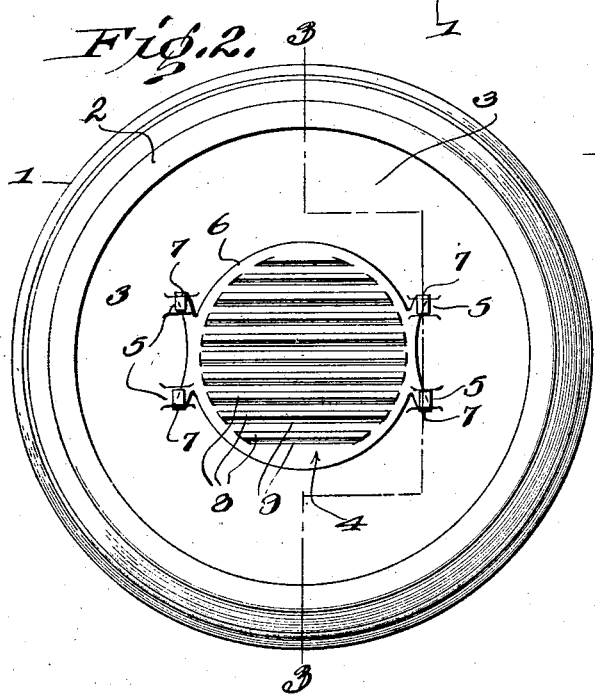
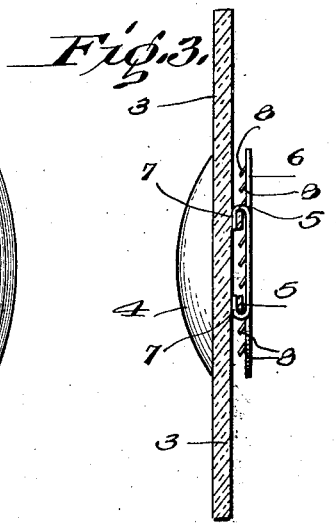
Inventor
Louis E. Rice Patented Mar. 1, 1927.

1,619,038

UNITED STATES PATENT OFFICE.

LOUIS E. RICE, OF NEW MARTINSVILLE, WEST VIRGINIA.

AUTOMOBILE LENS.

Application filed July 13, 1926. Serial No. 122,128.

This invention relates to a lens structure especially adapted to be used in conjunction with automobile headlights and it consists in the novel features hereinafter described and claimed.

An object of the invention is to provide a lens having its parts and features so arranged and assembled as to permit ample rays of the light to penetrate or pass through the same for the purpose of illuminating a roadway and at the same time preventing the stronger direct rays of light from producing strong glare which will dazzle the vision of those who may be in advance of the machine upon which the light is mounted.

A further object of the invention is to provide a non-glare lens having a light focusing area and with a shutter or blind mounted upon the lens and disposed opposite the light focusing area thereof.

With these objects in view, the lens comprises a transparent body having at its center a light focusing area generally termed the bull's eye. The body of the lens is provided at its inner surface with transparent binding posts disposed at the edges of the said focusing area. A shutter plate is provided with lugs which engage the binding posts whereby the said plate is supported upon the lens and disposed opposite the focusing area thereof. The said plate is provided at its intermediate portion with a number of slits and the material of the plate adjacent the slits is bent inwardly between the body of the plate and the adjacent surface of the lens thereby providing openings through the intermediate portion of the plate through which the rays of light may pass and in turn the said rays may pass through the focusing area of the lens and will be broken up into relatively small streams so that the intensity of the volume of the column of light which passes through the focusing area is reduced, thus preventing blinding or dazzling and reducing the glare of the lens.

In the accompanying drawings:

Figure 1 is a side elevational view of an automobile lamp with parts broken away and showing the lens applied thereto and in transverse section, Figure 2 is a front elevational view of the lamp and lens, and Figure 3 is a transverse sectional view of the lens cut on the line 3—3 of Figure 2.

As illustrated in the accompanying drawings, the body of the lamp to which the non-glare lens is applied is shown at 1. The said body is provided with lens retaining flanges 2. The lens includes a body 3 of transparent material which is held in the body 1 of the lamp between the flanges 2 in a usual manner. The body of the lens 3 is provided at its center with a focusing area 4 having a convexed outer surface adapted to focus or intensify the volume of light passing through the said portion. The body of the lens 3 is provided at its inner side and at the edges of the area 4 with binding posts 5 also of transparent material. The body 3, the area 4 thereof, and the posts 5 are integral and preferably formed from glass. A shutter plate 6 is provided at its edges with curved lugs 7 which engage in the binding posts 5 and hold the plate 6 spaced from the inner surface of the lens 3 and opposite the focusing area 4 thereof. Openings 9 are formed at the intermediate portion of the shutter plate 6 and the material of the said plate adjacent the openings 9 is bent inwardly forming shutter sections 8 which are disposed between the plate 6 and the inner surface of the body 3 of the lens. By bending the sections 8 inwardly as stated, the openings 9 are enlarged so that rays of light may pass readily through the said openings and through the focusing area 4 of the lens.

The rays of light are prevented from freely passing through the marginal portion of the body of the lens 3 as this portion of the lens is closely figured or mottled so as to eliminate the producing of a glare through such portion of the lens. These rays of light will be ample to illuminate the roadway in advance of the machine upon which the lamp is mounted. The rays of light which pass through the focusing area 4 of the body of the lens are broken into relatively small streams and these streams are intensified by being focused but in view of the fact that they are broken, the volume of light which passes through the focusing area 4 is not of sufficient intensity as to produce glare and dazzle the vision of those who may be in advance of the machine upon which the lamp is mounted. At the same time the focused light will be sufficient to amply illuminate the roadway in advance of the machine carrying the lamp.

From the foregoing description taken in conjunction with the accompanying drawings, it will be seen that I have provided an automobile headlight lens having its elements and features so arranged and assembled as to permit ample light to pass through the same to properly illuminate a roadway without danger of producing glare or dazzle the vision of those in advance of the automobile machine.

It is to be understood that the form of my invention herewith shown and described is to be taken as the preferred example of the same, and that various changes as to the shape, size, and arrangement of parts may be resorted to without departing from the spirit of the invention or the scope of the subjoined claims.

Having described the invention, what is claimed is:

1. A non-glare lens comprising a transparent body having an intermediate light focusing area and a shutter plate mounted upon the body and having openings disposed opposite the light focusing area thereof.

2. A non-glare lens comprising a transparent body having an intermediate light focusing area, said body being provided at its side surface and adjacent the edge of the light focusing area with posts of transparent material, and a shutter plate having lugs engaging said posts, said shutter plate being provided with openings disposed opposite the light focusing area of the lens.

3. A non-glare lens comprising a transparent body having a light focusing area and provided with posts located adjacent the edges of said area, a shutter plate having curved lugs engaging the posts, said plate being provided with intermediate openings disposed opposite the light focusing area of the body and the material of the plate adjacent said openings being bent inwardly towards the light focusing area of the body.

In testimony whereof, I have affixed my signature.

LOUIS E. RICE.